May 31, 1927.　　　　F. MOSSBERG　　　　1,630,668

METHOD OF CONNECTING TWO MEMBERS WHICH ARE NOT ADAPTED TO BE WELDED TOGETHER

Filed Nov. 1, 1921

Inventor
Frank Mossberg
By Howard E. Barlow
Attorney

Patented May 31, 1927.

1,630,668

UNITED STATES PATENT OFFICE.

FRANK MOSSBERG, OF ATTLEBORO, MASSACHUSETTS, ASSIGNOR TO MOSSBERG PRESSED STEEL CORPORATION, OF ATTLEBORO, MASSACHUSETTS, A CORPORATION OF MASSACHUSETTS.

METHOD OF CONNECTING TWO MEMBERS WHICH ARE NOT ADAPTED TO BE WELDED TOGETHER.

Application filed November 1, 1921. Serial No. 512,070.

This invention relates to an improved method of connecting together two members, by a spot-welding process, which are not adapted to be welded together, and the object of this invention is to form a number of holes through the member which is to be attached and place it upon the other member which is formed of electric conducting material, then place rivet pins of weldable material through these holes with their ends engaging the weldable member, an electric current is now passed by a spot welding method, through the conducting plate and the pin, at the same time applying sufficient endways pressure to the pin to cause its outer end to spread and its inner end to be welded to the opposite plate thereby firmly securing the two members together without passing the rivets through both.

A further object of the invention is to broaden the welding end of the rivet pin by spreading it into the countersunk inner end of the rivet hole.

With these and other objects in view, the invention consists of certain novel features of construction, as will be more fully described, and particularly pointed out in the appended claims.

It is found in practice particularly in the construction of loom beam heads, spools, etc., that where a gear or other member is riveted to the outer face of the main plate the rivets upon passing through the main plate to the inner face thereof, are apt to work loose and project and so cause the yarn to catch thereon, to avoid which I have provided a method by which the cast-iron gear may be attached to the steel head-plate without being obliged to pass the rivets through the plate, and the following is a detailed description of one method by which this result may be accomplished:—

Figure 1:
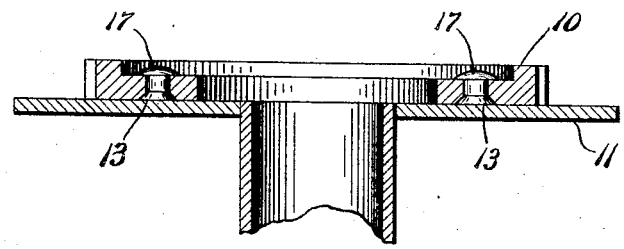
Figure 1 is a sectional side elevation illustrating a cast-iron gear riveted by a spot-welding method to a steel plate.
Figure 2:
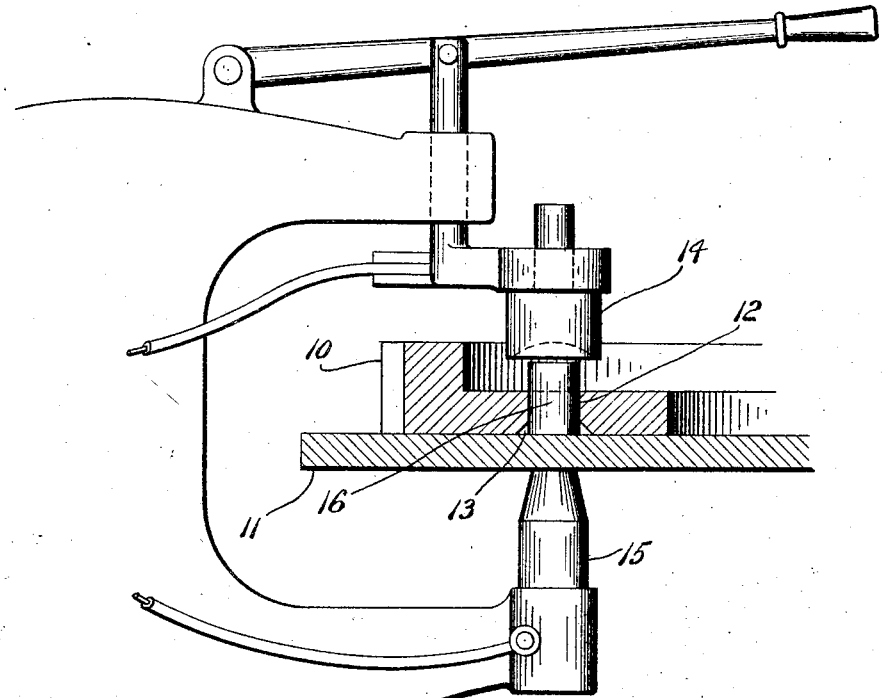
Figure 2 is a view illustrating the method of applying pressure and a welding current to the rivet pin to spot weld the end of the rivet to the steel plate and spread the outer end to rivet the head upon the same.

In practice some beam heads are obliged to be provided with ring gears on their outer faces, and as it is the best mechanical construction to form gears for this purpose of cast iron which, as is known, is not adapted to be welded to steel, some difficulty has heretofore been experienced in providing satisfactory means for connecting this cast-iron ring to a steel head-plate. In some cases holes are provided in the gear ring 10 and also through the steel head-plate 11, then holes are counterbored in the face of the plate to receive the rivet-head and the gear and so riveted in position, but after a time the driving action upon this gear serves to loosen the rivets and their heads become roughened somewhat on the inner surface of the beam-head plate so that yarn wound thereon would catch and break or be injured. To avoid this difficulty applicant has provided simple and effective means whereby the ring may be riveted to the head-plate without passing the rivets through the plate, which is that of drilling the ring only as at 12 at suitable intervals all around its circle, counterboring the inner end of each drilled hole as at 13, then the ring is positioned upon the head-plate and both are placed in a spot-welding machine such as that illustrated in Figure 2, a short pin 16 of steel or other weldable material is placed in these holes, current is then applied through the electrodes 14 and 15 and as the pin is fused or softened by heat a slight endways pressure is applied thereto through the electrodes which causes the inner end of the pin to spread out into the counterbored space 13 and the upper end to be rounded over as at 17 the inner enlarged end of this pin is now securely welded to the steel head-plate thereby securely riveting the ring to the head-plate by a spot-welding method and that without passing the rivets through the head in which case it will be seen that the inner face of the head-plate is left entirely smooth without objectionable rivet heads projecting therethrough.

I do not wish to be restricted to the method of connecting a cast-iron gear-ring to the outer surface of a yarn beam head as my improved spot-weld-riveting method may be employed for connecting together any two members one only of which is adapted to have the rivet's end welded to it.

Having thus described one illustrative embodiment of my invention and the best mode known to me for carrying out my method, I desire it to be understood that although specific terms are employed, they are used in a generic and descriptive sense and not for the purpose of limitation, the scope of the invention being defined and limited only by the terms of the appended claims.

I claim:

1. An improved method of attaching a member to a plate of electrically conducting material, which consists in forming a hole through the member, enlarging the hole at its inner end positioning the member on the plate, inserting a pin of material weldable to said plate in said hole with its end engaging said plate passing an electric current through the plate and the pin to weld them together at one end and simultaneously exerting an endways pressure on the pin to spread its inner end into the enlarged portion of the hole.

2. An improved method of attaching a ring of cast iron to a comparatively thin plate of steel which consists in forming a hole in the iron enlarging the hole at its inner end inserting a rivet pin of material weldable to said steel into the hole with its inner end engaging the steel, applying pressure to the pin, and simultaneously passing an electric current through the pin and plate to weld the two together, heading over one end of the pin, and spreading the other end into the enlarged portion of the hole.

3. An improved method of attaching two metal plates non-weldable to each other, one of said plates being imperforate and the other having a hole therein, which consists in enlarging the hole at its inner end, inserting a rivet pin weldable to the imperforate plate into the hole with its inner end engaging the imperforate plate, applying pressure to the pin and simultaneously passing an electric current through the pin and imperforate plate to weld the pin to the plate, and heading over one end of the pin and spreading the other end into the enlarged portion of the hole.

In testimony whereof I affix my signature.

FRANK MOSSBERG.